(12) United States Patent
Burnell

(10) Patent No.: X8284
(45) Date of Patent: Jun. 26, 1834

(54) INCLINED PLANES FORLOCOMOTIVE ENGINE

(76) Inventor: Levi Burnell

United States Patent

Patent No.: X8284

Levi Bissell

The schedule referred to in these Letters Patent and making
part of the same containing a description in the words of
the said Levi Bissell himself of his improvement in
the machine for propelling Boats on Canals and
Shoal Waters.

To all to whom these presents shall come
Be it known that I Levi Bissell of Elyria in the
County of Lorain and State of Ohio have invented
a new and useful improvement in a machine for pro-
pelling boats on Canals and Shoal water and that
the following is a full and exact description of the cons-
truction and operation of said machine as invented by
me. A sun wheel A. eight or nine feet in diam-
eter, from two to three inches thick formed into notch-
es on the periphery and if necessary shod with iron,
has its axis hung upon bearings a. at the end of a substan-
tial bar B. about sixteen feet long. Said bar at the
wheel end being so divided as to pass each side of said whe-
el. The opposite end of said bar has also a shaft b. pass-
ing through it with cranks c. at right angles on opposite sides
of said bar, from these cranks to other cranks d. correspon-
ding therewith on opposite sides of the wheel A. pass con-
necting rods, so that the revolving of the shaft b. at the
end of the bar B. opposite will cause the wheel A to re-
volve. The wheel A. is intended to traverse the canal
cutting the water in its path, and of sufficient weight
or so loaded as to take hold upon the bottom of the canal
and rising and falling freely accommodates the wheel
to the bottom, be it ever so uneven. The whole being sus- Ed. H.
tained by suitable braces d. & guides e. forms a simple & [illegible]
sufficient propeller adaptable to craft of any size in
shoal water and may be used separately or in connection with
ordinary paddle wheels of steamers. Witnesses Levi Bissell
Eleazar Day
G. N. [illegible]
363 [illegible]

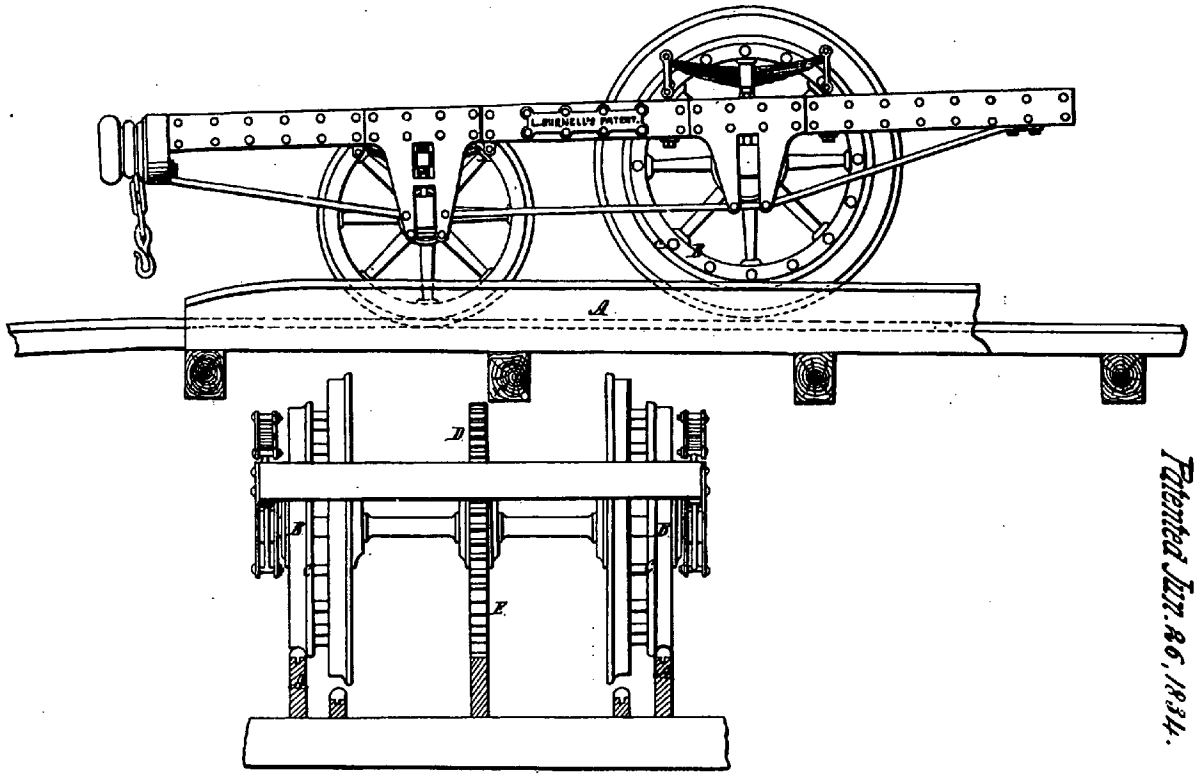

United States Patent
Patent No.: X8284
*L. Burnell.*
*Inclined Railroad.*
*Patented Jun. 26, 1834.*